(12) United States Patent
Hancock et al.

(10) Patent No.: US 9,191,423 B2
(45) Date of Patent: Nov. 17, 2015

(54) CALLER-ID FOR REDIRECTED CALLS FROM SIP-PBX

(71) Applicant: Cable Television Laboratories, Inc., Louisville, CO (US)

(72) Inventors: David Hancock, Broomfield, CO (US); Sumanth Channabasappa, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/732,199

(22) Filed: Jun. 5, 2015

(65) Prior Publication Data

US 2015/0281291 A1    Oct. 1, 2015

Related U.S. Application Data

(63) Continuation of application No. 13/930,153, filed on Jun. 28, 2013, now Pat. No. 9,060,002.

(51) Int. Cl.
*H04L 29/06* (2006.01)

(52) U.S. Cl.
CPC ........ *H04L 65/1096* (2013.01); *H04L 65/1006* (2013.01); *H04L 65/1053* (2013.01); *H04L 65/1069* (2013.01)

(58) Field of Classification Search
CPC ............ H04L 65/1069; H04L 65/1006; H04L 65/1096
USPC .......................................... 370/259, 352, 260
See application file for complete search history.

(56) References Cited

U.S. PATENT DOCUMENTS

| | | | |
|---|---|---|---|
| 2009/0052644 A1* | 2/2009 | Wood et al. | 379/142.06 |
| 2009/0217039 A1* | 8/2009 | Kurapati et al. | 713/168 |
| 2009/0262706 A1 | 10/2009 | Zhu et al. | |

* cited by examiner

*Primary Examiner* — Jamal Javaid
(74) *Attorney, Agent, or Firm* — Great Lakes Intellectual Property, PLLC

(57) ABSTRACT

Facilitating Voice over Internet Protocol (VoIP) phone calls where at least a portion of the phone call relies upon signaling exchanged as part of a Session Initiated Protocol (SIP) session conducted through a SIP Private Branch Exchange (SIP-PBX) is contemplated. Caller-ID and/or security measures may be implemented to enable caller-ID when the SIP-PBX is untrusted.

20 Claims, 5 Drawing Sheets

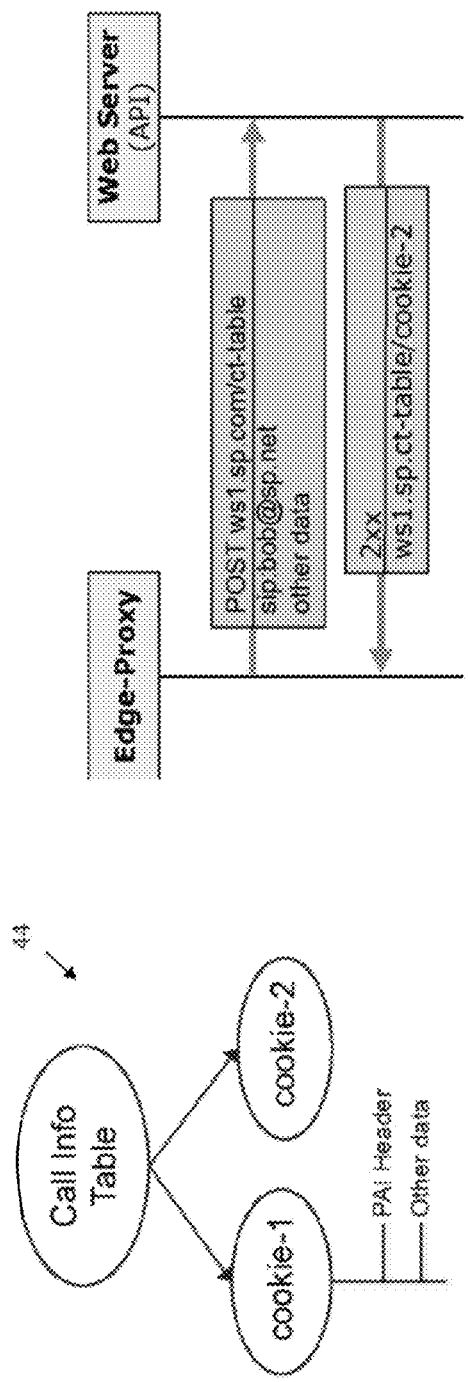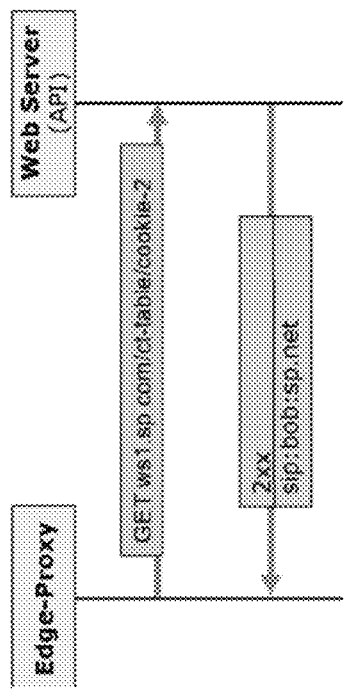

CALLER-ID FOR REDIRECTED CALLS FROM SIP-PBX

CROSS-REFERENCE TO RELATED APPLICATIONS

This application is a continuation of U.S. application Ser. No. 13/930,153, the disclosure and benefits of which is incorporated in its entirety by reference herein.

TECHNICAL FIELD

The present invention relates to Voice over Internet Protocol (VoIP) phone calls where at least a portion of the phone call relies upon signaling exchanged through a Session Initiated Protocol (SIP) Private Branch Exchange (SIP-PBX), such as but not necessary limited to facilitating caller-ID when the SIP-PBX is untrusted.

BACKGROUND

Calling name and number information may be carried in SIP invites in the P-Asserted-Identity (PAI) header. To convey this info securely, SIP uses a transitive trust model, where adjacent network entities in the signaling chain trust the caller-ID info received from their previous-hop entity. The transitive trust model breaks down when there is an untrusted entity in the signaling chain. This can occur for SIP-PBX call scenarios where the untrusted SIP-PBX receives an incoming call from the service provider network and a feature (like call-forwarding) causes the SIP-PBX to redirect the call back to the service provider network. For example, in a transitive trust model, if Alice activates call-forwarding on her office phone to redirect incoming business calls to her mobile phone over lunch hour, the redirected SIP invite transmitted to the mobile phone may identify the SIP-PBX of Alice's office phone instead of the party attempting to call Alice due the untrustworthiness of the SIP-PBX.

The operation of such a transitive trust model may include, if Bob is the party attempting to call Alice, the service provider network sending a first invite to the SIP-PBX targeting Alice's office number. The first invite may contain SIP parameters identifying the calling name and number of Bob. When Alice has activated call-forwarding, the SIP-PBX may responsively initiate a second invite toward the service provider network targeting Alice's mobile number. If the service provider receiving the second invite determines the SIP-PBX to be untrusted, the service provider network may remove a received PAI header identifying Bob prior to transmitting a third invite to Alice's mobile phone. The PAI header identifying Bob may be replaced with a new PAI header identifying Alice's office calling name and number, which may be done in order to avoid calling name/number spoofing when the service provider network does not trust a calling name/number received from the SIP-PBX unless the name/number belongs to the SIP-PBX.

One non-limiting aspect of the present invention contemplates enabling the service provider to include caller-ID information for Bob when the SIP-PBX is untrusted in order to facilitate identifying Bob within the PAI header provided to Alice's mobile phone, which may be beneficial in allowing Alice to identify callers when forwarding phone calls from the untrusted SIP-PBX of her office phone.

BRIEF DESCRIPTION OF THE DRAWINGS

FIG. 2 shows a high-level resource hierarchy diagram in accordance with one non-limiting aspect of the present invention.

FIG. 3 illustrates adding an entry to a call information table entry in accordance one non-limiting aspect of the present invention.

FIG. 4 illustrates querying an entry in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
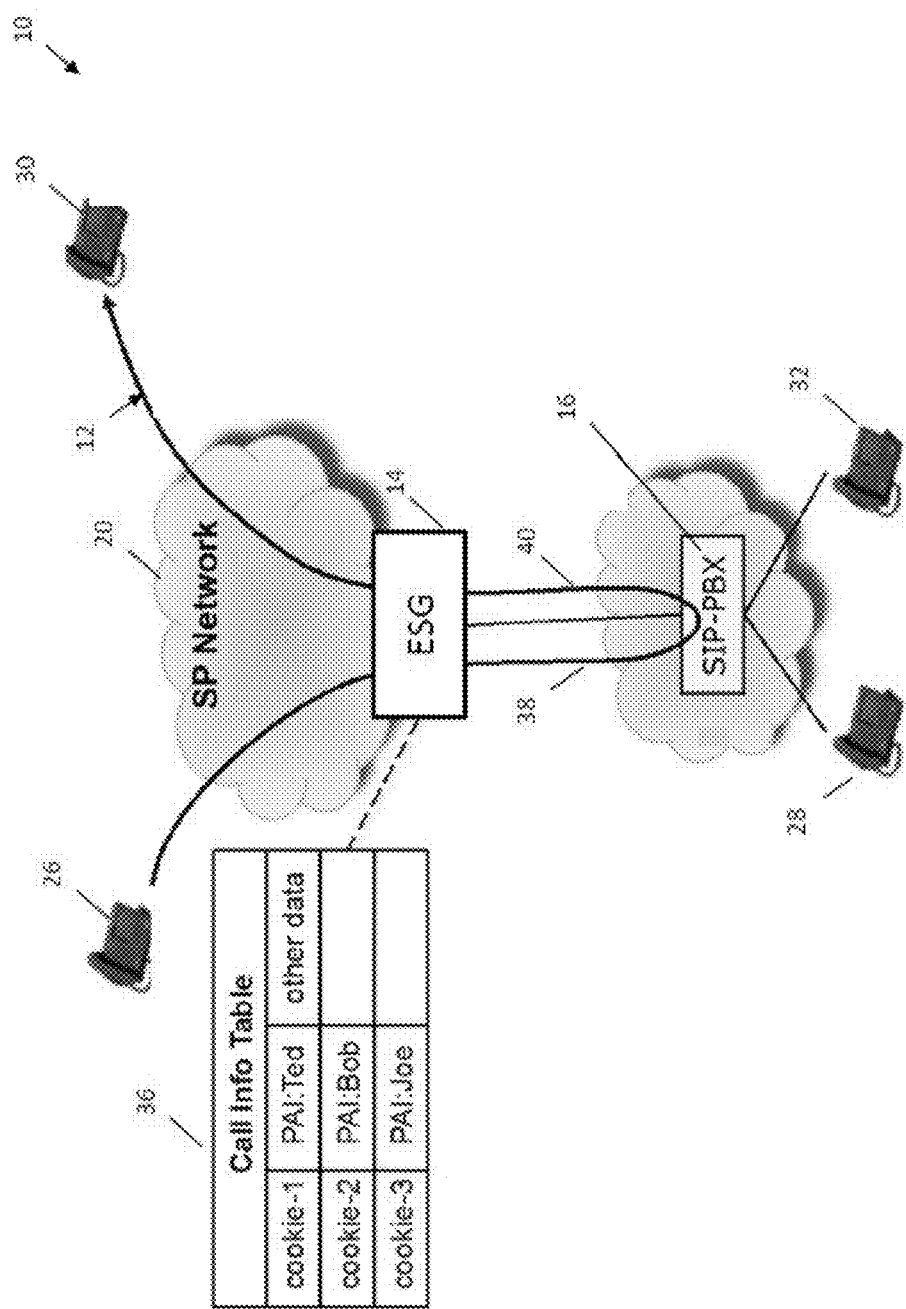
FIG. 1 illustrates a phone system in accordance with one non-limiting aspect of the present invention.

FIG. 1 illustrates a phone system 10 in accordance with one non-limiting aspect of the present invention. The system 10 is shown to facilitate a Voice over Internet Protocol (VoIP) phone call 12 when at least a portion of the phone call 12 relies upon signaling exchanged as part of a Session Initiated Protocol (SIP) session where at least a portion of the SIP session occurs between an Enterprise SIP Gateway (ESG) 14 and a SIP Private Branch Exchange (SIP-PBX) 16. The system 10 is predominately described with respect to facilitating the VoIP phone call 12 using SIP for exemplary non-limiting purposes as the present invention is not necessarily limited to facilitating VoIP phone calls and/or the use of SIP communications. The ESG 14 and/or another type of edge-proxy 14 may be configured in accordance with the present invention to facilitate enabling caller-ID when the SIP-PBX 16 is untrusted. The ability to facilitate caller-ID when the SIP-PBX 16 is untrusted may be beneficial in allowing the present invention to facilitate caller-ID when the ESG 14 would otherwise replace caller-ID information included within SIP messaging received from the untrusted SIP-PBX 16, such as in the manner described above with respect to SIP-based systems that rely on a transitive trust model to facilitate caller-ID.

A single ESG 14 and SIP-PBX 16 is shown for exemplary non-limiting purposes as the ESG 14 and/or the SIP-PBX 16 may be configured to facilitate simultaneous signaling with any number of ESGs 14 and/or SIP-PBXs 16. A first network 20 and a second network 22 are shown to facilitate communications with a first device 26, a second device 28, a third device 30 and a fourth device 32. The first network 20 may correspond with a service provider network or wide area network (WAN) and the second network 22 may correspond with a private or local area network (LAN). The WAN 20 and LAN 22 may be differentiated according to addressing used to communicate over each, at least in that the WAN 20 may require globally unique or outside address (e.g., globally unique Internet Protocol (IP) address) and the LAN 22 may require locally unique or inside addresses, optionally assigned by the ESG 14 and/or the SIP-PBX 16. The ESG 14 and/or the SIP-PBX 16 may include network address translation (NAT) capabilities sufficient to facilitate assigning inside and/or outside address to devices attempting to communicate therewith, i.e., the first, second, third and/or fourth devices 26, 28, 30, 32. The first and/or second networks 20, 22, or additional networks, may comprise any type or wired and/or wireless infrastructures, or a combination thereof, to facilitate the contemplated signaling.

The present invention contemplates differentiating between trusted and untrusted SIP-PBXs 16 or other endpoints attempting to facilitate VoIP related signaling through the ESG 14. The trusted may be based on various operational requirements associated with a transitive trust model or other model where the relationship between the ESG 14 and the SIP-PBX 16 may be analyzed prior to permitting the SIP-PBX 16 to include information within SIP messaging used to establish the phone call 12. The trust may be based on service providers associated with the ESG 14 and/or the SIP-PBX 16 having a complimentary relationship or approved relationship, i.e., ESGs 14 and SIP-PBXs 16 associated with the same service providers or service providers having a contractual relationship may be automatically deemed as trusted. Trust may also be established based on credentials or other information provided from the SIP-PBX 16 to the ESG 14, such as a certificate previously issued to the SIP-PBX 16 establishing a trusted relationship with the ESG 14. One aspect of the present invention contemplates the SIP-PBX 16 being an off-the shelf component or customer premise equipment (CPE) purchased and connected to the ESG 14 or other endpoint of a particular service provider prior to being authenticated or otherwise establishing a certain level of trust such that the SIP messaging transmitted therefrom may be considered to be untrusted until additional trust establishment procedures are executed.

One non-limiting aspect of the present invention contemplates facilitating caller-ID when the SIP-PBX 16 is untrusted by correlating calls originating from the SIP-PBX 16, which may be referred to as direct outward dialing (DOD), with calls originating from or outside of the ESG 14, which may be referred to as direct inward dialing (DID). This may include adding supplemental information to the SIP signaling messages exchanged between the ESG 14 (service provider network) and the SIP-PBX 16 so that when the SIP-PBX 16 redirects a DID call from the ESG 14 to a DOD call to the ESG 14, the ESG 14 can correlate the new incoming DOD call request with the corresponding active outgoing DID call request to the SIP-PBX 16. In this manner, the ESG 14 can trust the caller ID of the call sent to the SIP-PBX 16 if it can correlate the two call legs, thereby enabling it to confidently assert the identity of the calling user for the incoming (forward-to) call leg. The information added to the DOD call, or more particularly the SIP messaging being redirected from the SIP-PBX 16 to facilitate forwarding an incoming phone call from the first device 26 to the third device 30, may be determined from a call information table 36 or other database generated and/or maintained by the ESG 14.

The call information table may be used to tabulate SIP related information for each leg 38, 40 of the redirected call 12, i.e., the DID/SIP messages originating from the first device 26 with the DOD/SIP messaging originating from SIP-PBX 16. The caller information table 36 may be configured to store P-Asserted-Identity (PAI) and other call-related data for each DID call sent to the SIP-PBX 16. The ESG 14 may then use this table to verify the calling user identity for calls or redirects originating from the SIP-PBX 16. The process may include the ESG 14, before transmitting an SIP invite to the SIP-PBX 16, storing PAI header and other pertinent call data (e.g., time-stamp) related to a corresponding invite from the first device 26 in the call information table 36. A unique cookie may be assigned to for each incoming phone call to generate entries and associated cookies (e.g., PAIs and assigned cookies—cookie-1, cookie-2, cookie-3, etc.). The SIP-PBX 16 may transparently relay the PAI and the cookie previously assigned by the ESG 14. On receiving the corresponding SIP messaging from SIP-PBX 16, the ESG 14 may verify that the received PAI header matches the PAI header in the call information table 36 for the corresponding cookie. If they match, the PAI asserts the identity of Bob, resulting in an accurate caller-ID delivery to Alice's mobile device. If they do not match, a flag may be generated to indicate an error, spoofing or other attack on services.

The call information table 36 may be include as part of a network-based server (not shown) for sharing with multiple ESGs 14, which may be beneficial in matching incoming and outgoing SIP message across different ESGs 14. The server may provide a centralized location when multiple proxies need to access the same table entry, such as in a multi-Edge-Proxy 14 (ESG) deployment when one Edge-Proxy 14 sends the call to the SP-PBX 16 and a different Edge-Proxy 14 receives the redirected call from the SP-PBX 16. (As a simplification for SP networks where each enterprise is served by a single Edge-Proxy 14, the call information table 36 can be stored within the Edge-Proxy itself.) The call information table 36 may support a web services (or similar) API that is used by the Edge-Proxy 14 to query and update the table 36. FIG. 2 shows a high-level resource hierarchy diagram 44 for such an API in accordance with one non-limiting aspect of the present invention. When initiating call toward the SIP-PBX 16, the Edge-Proxy 14 may add a new entry to the call information table using a Hypertext Transfer Protocol (HTTP) procedure shown in FIG. 3. When receiving a call from the SIP-PBX 16, the Edge-Proxy 14 may query an entry in the Hypertext Transfer Protocol (HTTP) as shown in FIG. 4. The data in the call information table 36 may not be permanent such that the table may be cleared based on suitable parameters (e.g., call completion, timeout) or transferred to other data stores (e.g., to record fraudulent activity).

Figure 5:
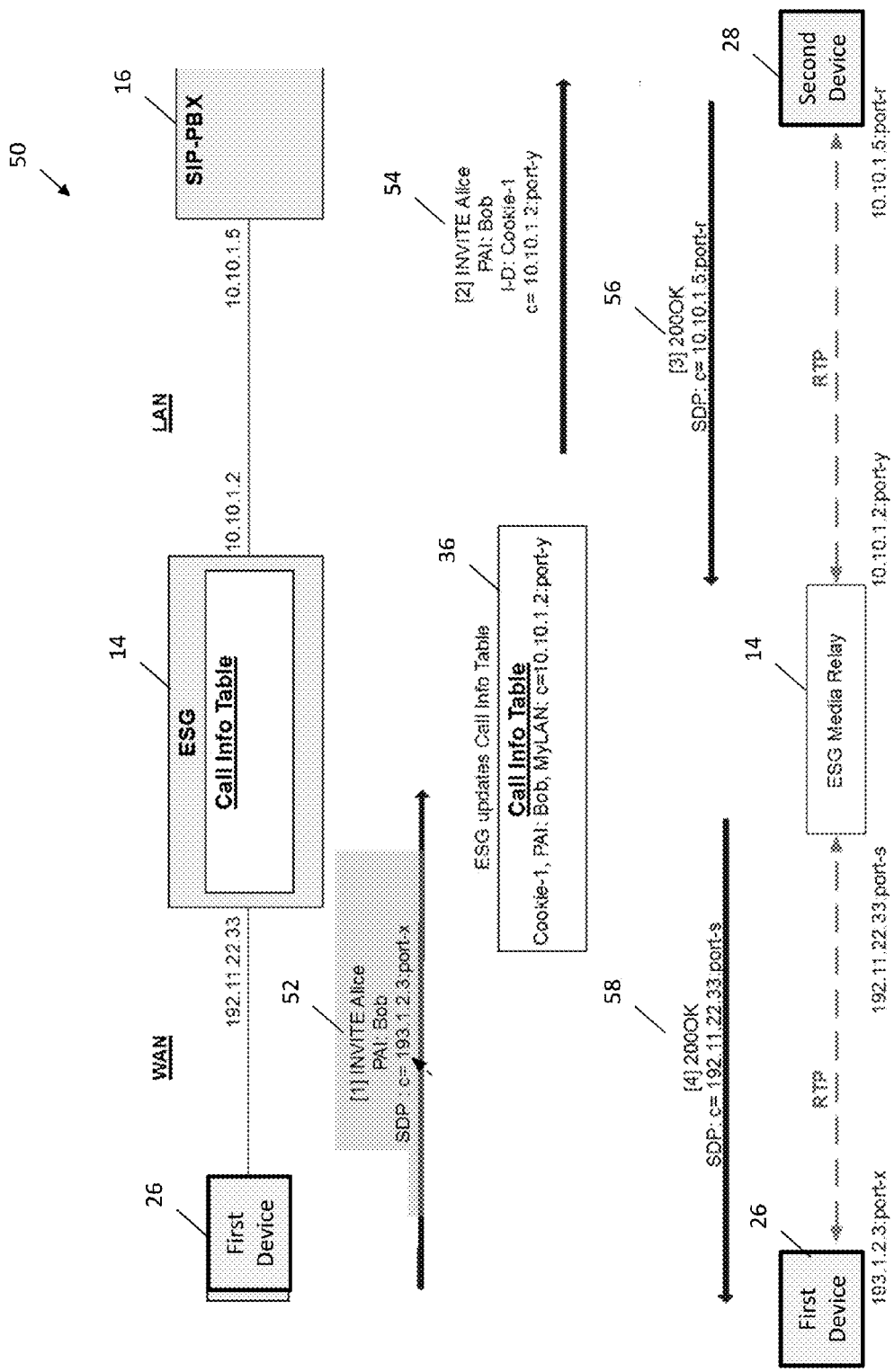
FIG. 5 illustrates a flowchart for facilitating caller-ID without redirection in accordance with one non-limiting aspect of the present invention.

FIG. 5 illustrates a flowchart 50 for facilitating caller-ID without redirection in accordance with one non-limiting aspect of the present invention. The flowchart illustrates a procedure for establishing a DID call between a caller (first device 26) located somewhere in the global network and a callee (second device 28) served by the untrusted SIP-PBX 16. In this example, the second device 28 does not have "redirecting" features enabled (e.g., no call-forwarding), in which case a bi-directional media connection using Real Time Protocol (RTP) media carried over the WAN 20 and the LAN 22 may be established between the first device 26 and the second device 28.

The procedure may be as follows:

[1] The first device 26 sends an invite 52 to first invite address (Alice) associated with a second device 28 of the callee. The invite 52 may contain PAI identifying the first device 26 (Bob) and a Session Description Protocol (SDP) message/information to establish the requisite RTP media connections for the phone call. (The SDP may be carried within SIP as SDP may not contain sufficient routing information to find the remote user such that it may be necessary to carry the SDP information with a VoIP protocol like SIP that supports the required routing information/mechanisms). The SDP may identify the IP address:port (first outside address, c=193.1.2.3; port-x) for the first device 26 where it is ready to receive RTP media packets from the second device 28. This first outside address may be assigned by the first device 26 or another device associated therewith. In its role as SIP-aware NAT, the ESG 14 may open a pinhole for the media between the first device 26 and the second device 28 by assigning an IP address:port (first inside address, c=10.10.1.2:port-y) on its LAN interface that acts as the media address for the first device within the enterprise network address space. The ESG 14 adds an entry to the call information table 36 that cross-references the caller (first device, Bob) with the other SIP information included within the invite 52 and records the LAN media address (first inside address) that it assigned for this call from Bob. It assigns "Cookie-1" as the key to this table entry.

[2] The ESG 14 updates the c=line to its newly assigned LAN IP address:port (first inside address), adds an I-D header containing cookie-1, and sends a corresponding invite 54 to the SIP-PBX 16. On receiving the invite, the SIP-PBX 16 sends the invite to Alice's phone, which rings her phone.

[3] When Alice answers her phone, the SIP-PBX 16 sends a 200OK response or invite 56 to the ESG 14. The 200OK 56 contains an SDP c=line that identifies an IP address:port (second inside address, c=10.10.1.5:port-r) on the SIP-PBX 16 that is ready to receive media packets for Alice from Bob.

[4] The ESG 14 assigns a WAN IP address:port (second outside address, c=192.11.22.33:port-s) that acts as Alice's media address within the WAN address space. It updates the SDP c=line with this new address, and sends a corresponding invite 58 to first device 26. Once the first device 26 receives invite, RTP media packets can flow in both directions between the first and second devices 26, 28, thereby establishing the phone call 12.

Figure 6:
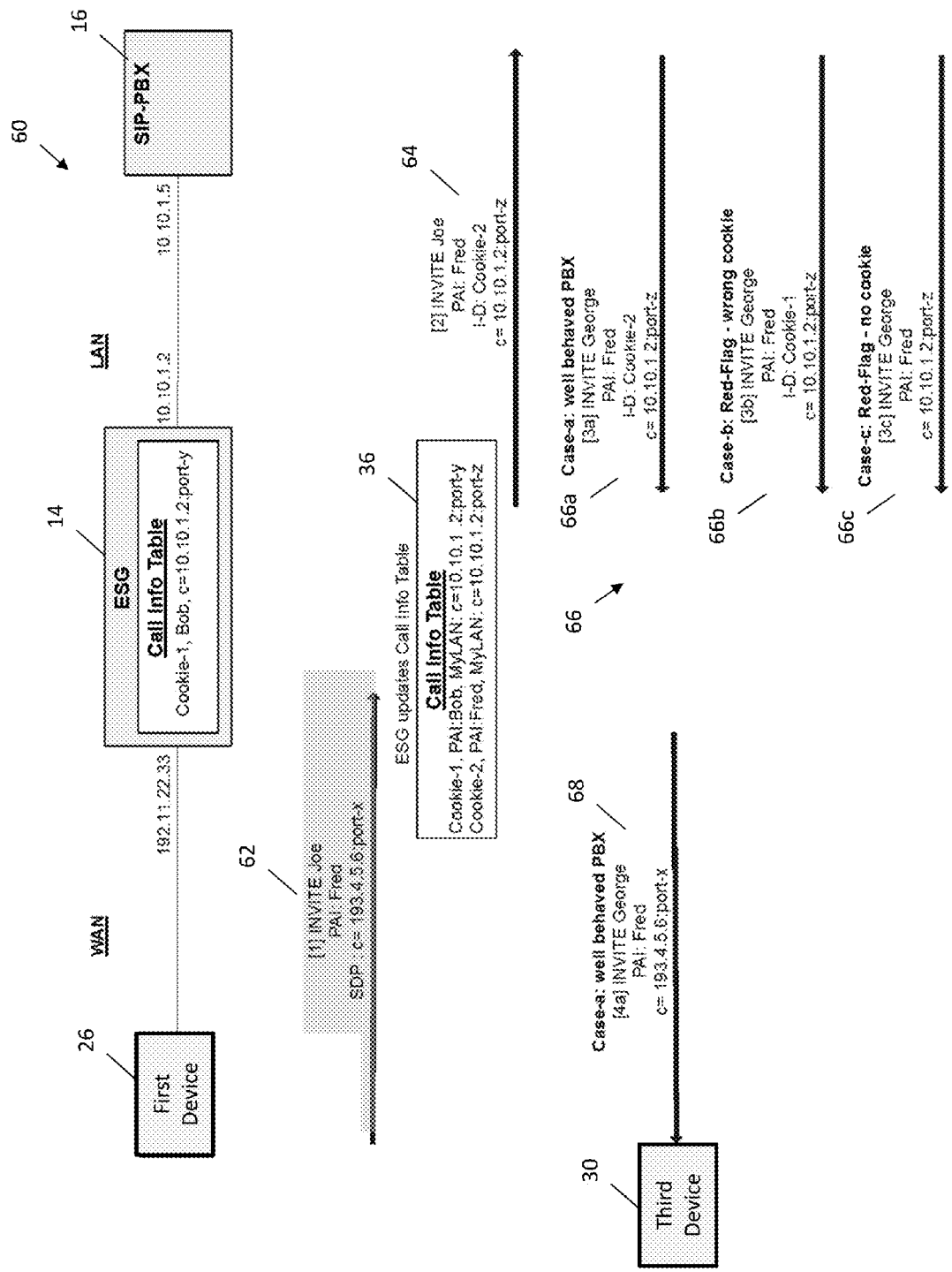
FIG. 6 illustrates a flowchart for facilitating caller-ID with non-hairpinned redirection in accordance with one non-limiting aspect of the present invention.

FIG. 6 illustrates a flowchart 60 for facilitating caller-ID with non-hairpinned redirection in accordance with one non-limiting aspect of the present invention. The redirection may correspond with the untrusted SIP-PBX 16 redirecting SIP related messaging received from the first device 26, which was intended to be received at the second device 28, to a third device 30 in order to facilitate establishing an RTP media connection for the corresponding phone call between the first device 26 in the third device 30 due to a redirection operation implemented at the SIP-PBX 16 for the second device 28 (e.g., call-forwarding). The RTP media signaling associated with the phone call may be considered as non-hairpinned due to being exchanged directly between the first device 26 and the third device 30 and/or between the first device 26 and the third device 30 without the RTP media associated with the phone call otherwise being routed through the SIP-PBX 16.

The process associated with facilitating the non-hairpinned redirection may begin with the first device 26 sending an invite 62 to first invite address (Joe) associated with a second device 28 of the callee. The invite 62 may contain a PAI (Fred) identifying the first device 26 and a SDP identifying the IP address:port (first outside address, c=193.4.5.6:port-x) for the first device 26 where it is ready to receive RTP media packets. This first outside address may be assigned by the first device 26 or another device associated therewith. In its role as SIP-aware NAT, the ESG 14 may open a pinhole for the media by assigning an IP address:port (first inside address, c=10.10.1.2:port-z) on its LAN interface. The ESG 14 may then add an entry to the call information table 36 that cross-references the caller (first device 26, Joe) with the other information included within SIP invite and records the LAN media address (first inside address) that it assigned for this call from Joe. It assigns "Cookie-2" as the key to this table entry.

The ESG 14 may update the c=line to its newly assigned LAN IP address:port (first inside address), add an I-D header containing cookie-2, and send a corresponding invite 64 to the SIP-PBX 16. On receiving the invite 64, the SIP-PBX 16 determines the redirection operation being active and responsibly generates a third invite 66 in order to facilitate establishing the non-hairpinned RTP media connection between the first device 26 and the third device 30. The flowchart 60 shows the third invite 66a being configured according to three different use cases: Case-a [3*a*] where the redirected invite is sent correctly, and cases b and c [3*b*, 3*c*] where the SIP-PBX 16 inserts the wrong or no cookie, which may incur in the event the SIP-PBX 16 is being spoofed, hacked or otherwise being inappropriately manipulated to facilitate the redirection. In all three cases, the ESG 14 notices that the received third invite includes a c=line that matches with the previously assigned first inside address (see equals 10.10.1.2:port-z), thereby indicating to the ESG 14 that this is a redirected call where the SIP-PBX16 is not hairpinning the media (another address would be used in place of the first inside address and the third invite if hairpinning (transmission of the RTP media associated with the phone call being transmitted through the SIP-PBX) was to occur).

On receiving one of the third invite 66a [3*x*], the ESG 14 may be configured to verify that the received c=address:port (first inside address) matches the parameter stored within the call information table 36 for the entry associated with the cookie-2. In the event the information is verified and/or matches, the ESG 14 may transmit a fourth invite 68 to facilitate establishing the RTP media connection between the first device 26 and the third device 30. The fourth invite 68 may be directed to a second invite address (George) specified within the third invite 66a and include the first PAI (Fred) and the first outside address, i.e., that the phone call between the first device and a third device 30 is to occur without hairpinning a portion of the RTP media through the SIP-PBX 16. The second invite address may be added to the third invite 66a at the SIP-PBX 16 and associated with the third device 30, i.e., the device identified as part of the redirection operation. The ESG 14 may be configured to permit continued use of the PAI (Fred) included within the third invite 66a, and thereby redirection of the caller-ID information associated with the first device 26 when the third invite 66a is verified. In the event information is unverified and/or fails to match, the ESG 14 may generate a flag or other warning to indicate it potentially unauthorized use of the redirection functionality or other inappropriate conduct of the untrusted SIP-PBX.

In the case of [3*a*] the SIP-PBX 16 may generate the third invite 66a to include the first PAI (Fred) specified within the first invite 62, the cookie-2 and the first inside address. The ESG 14 may recover the cookie-2 included within the third invite 66a and verify the third invite 66a due to the inclusion of the first PAI and the first inside address associated with the cookie-2. This matching of the DID (the first invite 62) with the DOD (the third invite 66a) based on additional information included within the second invite (cookie-2) may be differentiated from the process described with respect to FIG. 5 in that the process associated with FIG. 5 omitted the verification due to the call terminating at the SIP-PBX 16, i.e., without redirection. The process associated with FIG. 6 contemplates a scenario where redirection is implemented and a need exists to not only to provide caller-ID information to the third device 30 in order to enable third device operator to identify the caller associated the first device 26 but also to provide some security against hackers or others attempting to inappropriately control redirection of the SIP-PBX 16 for unauthorized activities.

The caller-ID information may be provided by enabling re-transmission or continued use of the PAI (Fred) included within the third invite 66a. The SIP-PBX 16 may be configured in the manner described above to re-transmit the PAI and cookie included within the second invite 64 in order to facilitate continued use of the caller ID information associated with the originating caller (Fred). Rather than replacing the PAI specified within the third invite 66a with a PAI previously associated with SIP-PBX 16 or with a default PAI, as the ESG 14 may be configured to do when receiving invites from an untrusted SIP-PBX or other endpoint, the ESG 14 may be configured to consider the untrusted SIP-PBX 16 as at least temporarily trusted when the third invite 66a is verified. When the information included within the third invite 66a sufficiently corresponds with the parameters stored within the call information table 36 for the cookie-2, the ESG 14 may relay the received PAI rather than replacing the received PAI with a default PAI. In this manner, one non-limiting aspect of the present invention contemplates facilitating including caller-ID information within the invite transmitted to the third device 30 as part of the redirection, which may be beneficial in facilitating use of caller-ID information when call forwarding or other redirection operations are implemented at an untrusted SIP-PBX 16.

The third invite 66a associated with use case 3a may correspond with a scenario where the SIP-PBX 16 is considered to be well behaved or otherwise operating in a manner consistent with trusted or authorized operations. One non-limiting aspect of the present invention contemplates providing security against spoofing or other hacking operations where unauthorized use of the redirection function may be used to facilitate an inappropriate use of the redirection capabilities. One contemplated security measure may correspond with identifying inconsistencies between the information stored within the call information table 36 for the first leg 38 of the call (DID, the first invite 62) and the second leg 40 of the call (DOD, the third invite 66a), i.e., the SIP-PBX 16 being improperly behaved. The security measures may be based on a presumption that the ESG 14 is within the domain or control of the service provider such that a hacker would be unable to identify the information collected by the ESG 14 when facilitating the SIP messaging between the first device 26 and SIP-PBX 16 (call information table 36). In other words, the security may be based on the presumption that access to the call information table 36 would be limited such that any invites received having information matching to that within the call information table 36 may be considered to be authentic due to the likelihood of a spoofer or hacker having access to the call information table being acceptably low.

The security measures contemplated by the present invention may be based on the SIP messaging associated with subsequently facilitate the RTP media connection necessary to establish the phone call 12. The reliance on SIP messaging, rather than data or other information included with RTP media, may be beneficial in allowing the security measures to be implemented prior to establishing the RTP media connection between the first and third devices 26, 30 or other devices, i.e., prior to consuming bandwidth or other services associated with establishing the phone call. The call information table and/or the entries or cookies cross-referenced therein may be temporary markers or metadata generated at the ESG 14 such that persistent certificates or encryption keys need not necessary be employed at the ESG 14 and/or distributed from the ESG 14 to the server or other ESGs 14, which may be beneficial in limiting system complexity associated with implementing the contemplated security measures. In particular, while the present invention contemplates encrypting the first, second or other invites with PKI certificates or other encryption keys, the use of such keys may undesirably require persistent storage and/or coordination amongst multiple ESGs 14 and devices whereas the locally generated or temporary information included within the call information table may not require the same persistence and/or coronation.

Unlike use case 3a where the information included within third invite 66a properly matches with information stored within the call information table for the corresponding phone call, i.e., the cookie-2, the use cases 3b and 3c correspond with additional scenarios where the third invite 66b, 66c may be unverified and a security breach may be determined. The third invite 66b associated with use case 3b may correspond with a scenario in which a hacker has been provided visibility to the cookie-1 and attempts to re-use that cookie as part of a spoofed redirection operation. The corresponding third invite 66b may be determined as unverified due to the additional information included therewith failing to match with the information previously stored within the caller information table 36 for the cookie-1, i.e., the included PAI (Fred) fails to match with the PAI (Bob) associated with the cookie-1 and/or the included second inside address (10.10.1.2:port-z) fails to match with the second inside address associated with the cookie-1 (10.10.1.2:port-y). The third invite 66c associated with use case 3c may correspond with a scenario in which a hacker fails to recognize use of either one of the cookie-1 and/or cookie-2 and instead simply attempts to instigate a DOD. Use case 3c may be particularly problematic in that the ESG 14 may face a dilemma as to whether the third invite 66c is associated with the first invite 62 and/or a new call originating through the SIP-PBX 16. Because the third invite 66c associated with use case 3c includes the first inside address previously assigned by the ESG 14, the ESG 14 may solve the dilemma by assuming that that address would not be re-used without a compromised security situation.

Figure 7:
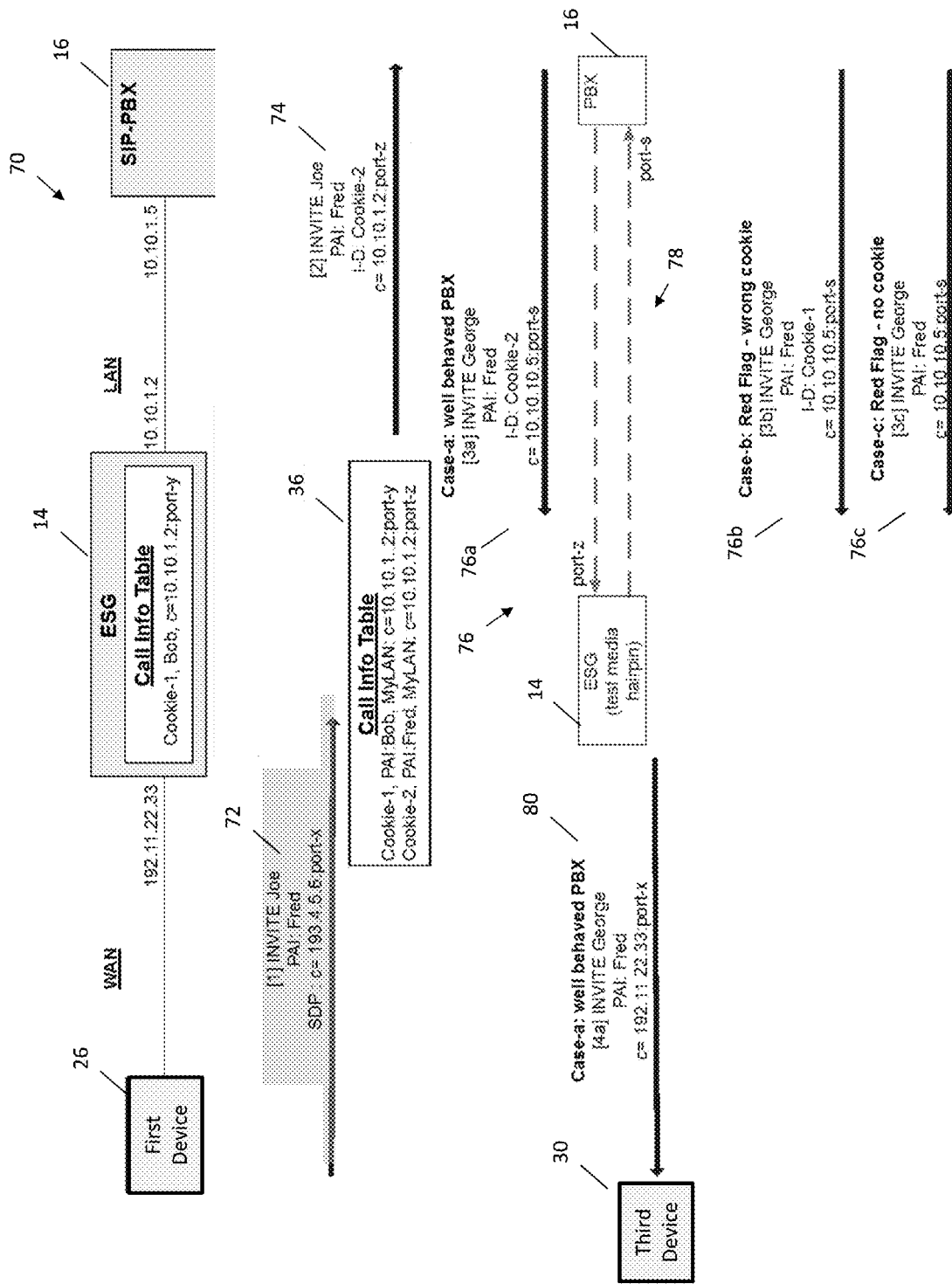
FIG. 7 illustrates a flowchart for facilitating caller-ID with hairpinned redirection in accordance with one non-limiting aspect of the present invention.

FIG. 7 illustrates a flowchart 70 for facilitating caller-ID with hairpinned redirection in accordance with one non-limiting aspect of the present invention. The hairpin redirection corresponds with the SIP-PBX 16 redirecting SIP messaging to a third device 30 and remaining within the subsequently established RTP media connection for the phone call. The process associated with facilitating the hairpinned redirection may begin with the first device 26 sending an invite 72 to a first invite address (Joe) associated with a second device 28 of the callee. The invite 72 may contain PAI (Fred) identifying the first device 26 and a SDP identifying the IP address:port (first outside address, c=193.4.5.6:port-x) for the first device 26 where it is ready to receive RTP media packets. The ESG 14 may open a pinhole for the media by assigning an IP address:port (first inside address, c=10.10.1.2:port-z) on its LAN interface that acts as the media address for the first device 26 within the enterprise network address space. The ESG 14 adds an entry to the call information table 36 that cross-references the caller (first device 26, Joe) with the other SIP information included within invite 72 and records the LAN media address (first inside address) that it assigned for this call from Joe. It assigns "Cookie-2" as the key to this table entry.

The ESG 14 may update the c=line to its newly assigned LAN IP address:port (first inside address), add an I-D header containing cookie-2, and send a corresponding invite 74 to the SIP-PBX 16. On receiving the invite 74, the SIP-PBX 16 determines the redirection operation being active and responsibly generates a third invite 76 in order to facilitate establishing the hairpinned RTP media connection between the first device 26 and the third device 30. The flowchart 70 shows three different use cases: Case-a [3a] where the redirected invite 76a is sent correctly, and cases b and c [3b, 3c] where the PBX inserts the wrong or no cookie, which may incur in the event the SIP-PBX 16 is being spoofed, hacked or otherwise being inappropriately manipulated to facilitate the redirection. In all three cases, the ESG 14 notices that the received third invite 76 includes a second inside address (c=line, 10.10.10.5port-s) that differs from with the previously assigned first inside address (c=line, 10.10.1.2:port-z), thereby indicating to the ESG 14 that this is either a normal non-redirected DOD call or a redirected call where the SIP-PBX 16 is hairpinning the media.

In case [3a] the ESG 14 notices that the invite contains an I-D header and from that it appears that a previous DID call is being redirected. The ESG 14 can test that the cookie identified in the I-D header is correct by assessing whether the additional SIP information included in the corresponding third invite 76a matches with the SIP information stored within the caller information table 36 for the identified cookie. In the well-behaved use case [3a], the information matches indicating a likelihood that the redirection is authorized. As there may be a possibility that an authorized user may successfully matched the cookie with the SIP information stored within the caller information table 36, one non-limiting aspect of the present invention contemplates facilitating an additional security measure. The additional security measure may relate to determining whether the third invite 76a passes a message routing test 78. The message routing test 78 may correspond with the ESG 14 transmitting a special RTP packet to the IP address:port (10.10.10.5:port-s) received in the c=line of the third invite and monitors the c=IP address:port (10.10.1.2:port-z) cached in the caller information table for the cookie-2 to determine whether the RTP packet was relayed by the SIP-PBX 16 to the appropriate pinhole of the ESG 14.

The third invite 76a may be verified if the RTP packet is routed back to the expected pinhole of the ESG 14 such that a fourth invite 80 may be transmitted to the third device 76a in order to facilitate establishing RTP media connection between the first device 26 and the third device 30. The fourth invite 80 may include a second invite address (George) associated with the third device 30 determined from the corresponding second invite address and included within the third invite 76a. The fourth invite 76a may include the first PAI (Fred) and a second outside address assigned by the ESG 14 to facilitate RTP media signaling with the third device 30. Since the third invite 76a was verified, the ESG 14 may permit passage of the first PAI included within the third invite 76a rather than replacing it with a PAI associated with the SIP-PBX 16. In the event the RTP packet fails to be routed back to the pinhole identify with the caller information table, the ESG 14 may determine the third invite 76a to be unverified. A flag or other corrective measure may be implemented to prevent transmission of the fourth invite 80 and/or to allow transmission of the fourth invite 80 while raising an alarm or otherwise contacting a system administrator regarding a potential unauthorized usage.

In case [3b], the ESG 14 monitors the c=line in the Cookie-1 entry (which is in fact the wrong entry), and doesn't detect the special RTP packet arriving at IP address:port 10.10.1.2:port-y. It therefore knows that this is a fraudulent call. As an option, the ESG 14 can enable monitoring of the special RTP packet across all entries in the call information table 36, in which case it would detect the special RTP packet arriving for the c=line associated with the cookie-2 entry. The ESG 14 could then identify Fred as the possible culprit. In case [3c], there is no I-D header, and therefore the ESG 14 doesn't know whether this is a normal (non-redirected) DID call or a fraudulent redirected call. To test this case, the ESG 14 enables monitoring for the special RTP packet across all entries in the call information table 36, and then sends the special RTP packet on the c=line of the [3c] invite 76b. On receiving the special RTP packet on the c=line associated with cookie-2, the ESG 14 knows that this is a redirected call, and suspects that Fred is stealing service. Optionally, with respect to case [3b] and [3c], the ESG 14 may automatically determine an error due to the PAI information failed to match with the cookie-1 (case [3b] 76b) or the third invite 76c failing to include any cookie (case [3c]).

Transmission of the special RTP packet over the pinholes assigned by the ESG 14 may be beneficial in scenarios where the SIP information fails to match with the SIP information stored within the call information table 36 in order to provide a double-check of the potential security breach. The transmission of the special RTP packet may also be beneficial in scenarios in which the SIP information properly matches, i.e., in situations in which an unauthorized user may have entered matching PAI and cookie information but fail to identify the proper inside address assigned by the ESG 14 for the corresponding cookie. This may provide an extra layer of security by preventing unauthorized users from snooping the SIP information included within another invite transmitted from the ESG 14 to the SIP-PBX 16 when attempting to redirect a subsequent phone call. The access security may relate to the ESG 14 assigning new pinholes (inside addresses) for each new phone call thereby preventing re-use of the cookie included within a previous phone call as the previous issue cookie would be associated with a different pinhole, thereby preventing the RTP packet from being relayed back to the pinhole associated with an improperly specified cookie.

One non-limiting aspect of the present invention relies on the cooperation of the SIP-PBX when redirecting DID-to-DOD calls, i.e., the SIP-PBX may need to pass the received cookie back to the SP network so it can correlate the two call legs. If a hacker were to modify the SIP-PBX code so that it either discards the received cookie or replaces it with another active cookie, then the SP network would assert the incorrect identity. In most SIP-PBX deployments, the Service Provider deploys a SP-owned and managed Session Border Controller (SBC) or ESG that relays both call signaling and media between the Service Provider network and the SIP-PBX (e.g., the PacketCable Enterprise SIP Gateway (ESG), as specified in Enterprise SIP Gateway Specification, PKT-SP-ESG-I01-101103, published Nov. 3, 2010 by Cable Television Laboratories, Inc., the disclosure of which is hereby incorporated by reference in its entirety). The ESG may be in a good position to detect when calls are redirected by the SIP-PBX back to the SP network. It should be noted that even these mechanisms may not be able to stop all cases of fraud. For instance, when there is an untrusted PBX, it may be difficult for the network to ascertain that the call forward information was indeed entered by the user—as this does not involve the network. However, these mechanisms can be used proactively to stop suspicious calls, or reactively to identify callers who may be engaging in fraud.

The SIP-PBX may support SIP signaling that can be relied on to indicate when a call has been redirected. Examples include: History-Info or Diversion header fields; the SIP-PBX indicating the redirecting number (i.e., number of user in SIP-PBX that is redirecting this DOD call) plus the reason for redirection (call-fwding, call xfer, etc); and Max-Forward header field. If the SIP-PBX complies with RFC3261, the disclosure of which is hereby incorporated by reference in its entirety, then it may decrement the Max-forwards header when it redirects DID/DOD. By setting the Max-forwards to a unique value, the ESG can distinguish between a normal DOD call and a DOD call that resulted from redirection. If the ESG suspects that redirection is occurring because of these header values, but the DOD call contains no cookie, or contains a cookie that points to a calling user different than the user identified in the History-Info header, then it can take appropriate action (e.g., block call, log the current Call-Info-Table entries).

The ESG can store information in the call information table that can be used to detect fraud. Specifically, it can store the time-stamp when it sent the DID invite to the SIP-PBX, and it can store the current state of the DID call (has it received no response, a 18× response, or a 200OK (answer) response). Then, when the ESG receives a DOD call containing a cookie, it can compare the time of the received DOD invite with the time stamp in the Call-Info-Table entry for the received cookie. It can also audit the DID call state with the call states that make sense for the types of redirection supported by the SIP-PBX. If the time delta or the call type doesn't make sense for the type(s) of redirected calls supported by the SIP-PBX, then the ESG can assume that the SIP-PBX swapped the received cookie for redirecting DID call with the active cookie received for another active DID call. In this case the ESG can take appropriate action (block the call, log all Call-Info-Table entries, etc). Example redirecting features that can be distinguished by time and state include: call-forward-all calls redirects immediately, and before a 18× response is received; call-forward-no-answer redirects after ~10 seconds, and after 18× and before 200OK response is received; and call-xfer redirects after ~30 seconds, and after 200OK response is received.

One non-limiting aspect of the present invention describes a mechanism for signaling calling name and number when a call originated within the global telephone network is redirected through an untrusted SIP-PBX (e.g., so when you receive a call forwarded from your office phone, you see the Caller-ID of the actual caller, and not the Caller-ID of your office phone). One aspect of the present invention contemplates facilitating the caller-ID continuance while simultaneously implementing security measures. While the present invention contemplates cryptographic methods for managing and storing hashes and other information suitable to managing security, a simpler mechanism (storage and lookup v/s cryptographic algorithms) for verifying the contents of the received PAI header on incoming calls from the SIP-PBX may be employed. Particularly when the case of handing redirected calls from the SIP-PBX, the SP network is both the originating and terminating network, and can therefore rely on information it previously collected in a call information table to provide security. For example, when the SP network receives an incoming request containing a PAI header that identifies a calling user that is not assigned to the SIP-PBX, it can assert the identity of the calling user by verifying that it currently has an active request sent to the SIP-PBX containing a PAI header that identifies the same user.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-readable medium having non-transitory instructions sufficient to facilitate caller-ID for calls being redirected through a Session Initiated Protocol (SIP) Private Branch Exchange (SIP-PBX), the non-transitory instructions being sufficient for:

determining direct inward dialing (DID) SIP invites directed downstream to the SIP-PBX;

adding a DID cookie to each of the DID SIP invites prior to reaching the SIP-PBX;

generating a call information table sufficient for cross-referencing the DID cookie added to each DID SIP invite with a DID caller-ID of the corresponding DID SIP invite;

determining direct outward dialing (DOD) SIP invites directed upstream from the SIP-PBX in response to one or more of the DID SIP invites, the DOD SIP invites including at least one of a DOD cookie and a DOD caller-ID; and performing a caller-ID related function for the DOD SIP invites as a function of the DOD cookie and/or DOD caller-ID included therein.

2. The computer-readable medium of claim 1 further comprising non-transitory instructions sufficient for performing the caller-ID related function to include generating a warning flag or undertaking a corrective measure for the DOD SIP invites including the DOD caller-ID and not the DOD cookie.

3. The computer-readable medium of claim 1 further comprising non-transitory instructions sufficient for performing the caller-ID related function to include generating a warning flag or undertaking a corrective measure for the DOD SIP invites where the DOD cookie included therein fails to match with one of the DID cookies included in the call information table.

4. The computer-readable medium of claim 1 further comprising non-transitory instructions sufficient for performing the caller-ID related function to include generating a warning flag or undertaking a corrective measure for the DOD SIP invites where the DOD cookie included therein matches with one of the DID cookies but the DOD caller-ID included therein fails to cross-reference with the DID caller-ID included in the call information table for the matching DID cookie.

5. The computer-readable medium of claim 1 further comprising non-transitory instructions sufficient for facilitating forwarding of the DOD SIP invites where the DOD cookie and the DOD caller-ID included therein matches with one of the DID cookies and the DID caller-ID cross-reference therewith in the call information table.

6. The computer-readable medium of claim 5 further comprising non-transitory instructions sufficient for removing the DOD cookie for the forwarded DOD SIP invites.

7. The computer-readable medium of claim 1 further comprising non-transitory instructions sufficient for facilitating forwarding the DOD SIP invites with alternative caller-ID information when:

having the DOD caller-ID and not the DOD cookie;

where the DOD cookie included therein fails to match with one of the DID cookies included in the call information table; and/or where the DOD cookie included therein matches with one of the DID cookies but the DOD caller-ID included therein fails to cross-reference with the DID caller-ID included in the call information table for the matching DID cookie.

8. The computer-readable medium of claim 1 further comprising non-transitory instructions sufficient for generating a flag for the DOD SIP invites with alternative caller-ID information when:

having the DOD caller-ID and not the DOD cookie;

where the DOD cookie included therein fails to match with one of the DID cookies included in the call information table; and/or where the DOD cookie included therein matches with one of the DID cookies but the DOD caller-ID included therein fails to cross-reference with the DID caller-ID included in the call information table for the matching DID cookie.

9. The computer-readable medium of claim 1 further comprising non-transitory instructions sufficient for facilitating:
identifying inward inside addresses assigned by an edge-proxy for each DID SIP invite, the inward inside addresses being tabulated within the call information table for the DID cookie associated with the corresponding DOD SIP invite, the inward inside address being sufficient to facilitate transmission of Real Time Protocol (RTP) media associated with each of the corresponding calls; and
performing a message routing test on the inward inside addresses prior to facilitating forwarding of the DOD SIP invites.

10. An Enterprise Session Initiated Protocol (SIP) Gateway (ESG) configured for facilitating a Voice over Internet Protocol (VoIP) phone call when at least a portion of the phone call relies upon SIP messaging to be redirected through an untrusted SIP Private Branch Exchange (SIP-PBX), the ESG being configured for:
receiving a first direct inward dialing (DID) SIP invite intended for transmission to the SIP-PBX;
adding a first cookie to the first DID SIP invite prior to being transmitted to the SIP-PBX;
cross-referencing the first cookie with a first P-Asserted-Identity (PAI) included within the first DID SIP invite;
receiving a first direct outward dialing (DOD) SIP invite transmitted from the SIP-PBX having the first cookie; and
transmitting the first DOD SIP invite without altering a second PAI included within the first DOD SIP invite if the second PAI matches with the first PAI cross-referenced with the first cookie.

11. The ESG of claim 10 further configured for transmitting the received first DOD SIP invite with an altered PAI if the second PAI fails to match with the first PAI cross-referenced with the first cookie.

12. The ESG of claim 10 further configured for:
receiving a second direct inward dialing (DID) SIP invite intended for transmission to the SIP-PBX;
adding a second cookie to the DID SIP invite prior to being transmitted to the SIP-PBX, the second cookie being different than the first cookie;
cross-referencing the second cookie with a third PAI included within the second DID SIP invite;
receiving a second DOD SIP invite transmitted from the SIP-PBX having the second cookie; and
transmitting the second DOD SIP invite without altering a fourth PAI included within the second DOD SIP invite if the fourth PAI matches with the third PAI cross-referenced with the second cookie.

13. The ESG of claim 12 further configured for:
receiving a third direct outward dialing (DOD) SIP invite transmitted from the SIP-PBX having the second cookie; and
generating a warning flag if a fifth included PAI of the third DOD SIP invite fails to match with the third PAI cross-referenced with the second cookie.

14. The ESG of claim 13 further configured for:
performing a message routing test for the third DOD if the fifth PAI matches with the second PAI, the messaging routing test including:
i) transmitting a Real Time Protocol (RTP) test packet to a first inside address assigned to by the SIP-PBX for the third DOD SIP invite; and
ii) determining whether the RTP test packet is received at a second inside addressed assigned by the ESG for the second DID SIP invite.

15. The ESG of claim 14 further configured for:
generating the warning flag if the ESG fails to receive the RTP test packet fails at the second inside address; or
transmitting the received third DOD SIP invite with an altered PAI in place of the fifth PAI.

16. A method of facilitating a Voice over Internet Protocol (VoIP) phone call when at least a portion of the phone call relies upon signaling exchanged as part of a Session Initiated Protocol (SIP) session, at least a portion of the SIP session occurring between an Enterprise SIP Gateway (ESG) and a SIP Private Branch Exchange (SIP-PBX), the method comprising:
determining a first direct inward dialing (DID) SIP invite originating from a first device attempting to place the phone call to a second device, the first device being located upstream from the ESG, the first DID SIP invite including a first P-Asserted-Identity (PAI) associated with the first device;
associating a first cookie with the first DID invite; and
facilitating transmission of a second DID SIP invite from the ESG to the SIP-PBX, the SIP-PBX being connected to the second device and being located downstream from the ESG, the second DID SIP invite including the first PAI and the first cookie.

17. The method claim 16 further comprising:
receiving a third direct outward dialing (DOD) SIP invite from the SIP-PBX issued from the second device in response to receipt of the second DID SIP invite;
transmitting a fourth DOD SIP invite including the first PAI to a third device if the third DOD SIP invite is verified, the fourth DOD SIP invite facilitating connecting the phone call between the first device and the third device without hairpinning through the SIP-PBX; and
generating a flag if the third DOD SIP invite is unverified.

18. The method of claim 17 further comprising:
i) determining the third DOD SIP invite to be verified if the third DOD SIP invite includes the first cookie and the first PAI;
ii) determining the third DOD SIP invite to be unverified if the third DOD SIP invite includes a second cookie and the first PAI; and
iii) determining the third DOD SIP invite to be unverified if the third DOD SIP invite includes the first PAI and not the first cookie.

19. The method claim 16 further comprising:
receiving a third direct outward dialing (DOD) SIP invite from the SIP-PBX issued from the second device in response to receipt of the second DID SIP invite;
transmitting a fourth DOD SIP invite including the first PAI to a third device if the third DOD SIP invite is verified, the fourth DOD SIP invite facilitating connecting the phone call between the first device and the third device with hairpinning through the SIP-PBX; and
generating a flag if the third DOD SIP invite is unverified.

20. The method of claim 19 further comprising determining the third DOD SIP invite to pass a message routing test if a Real Time Protocol (RTP) test message transmitted from the ESG over a Local Area Network (LAN) to the SIP-PBX at a second inside address is relayed back over the LAN to the ESG at a first inside address, the second inside address being assigned by the SIP-PBX and included with the third DOD SIP invite to facilitate transmission of the phone call.

* * * * *